United States Patent
Sikorski et al.

(10) Patent No.: US 11,458,813 B2
(45) Date of Patent: Oct. 4, 2022

(54) HEATING, VENTILATION, AND AIR CONDITIONING (HVAC) ASSEMBLY FOR MANAGING AIR MIXING DOOR KINEMATICS AND METHOD FOR MANAGING THE SAME

(71) Applicant: Valeo North America, Inc., Auburn Hills, MI (US)

(72) Inventors: Richard Sikorski, Auburn Hills, MI (US); Darshan Parikh, Auburn Hills, MI (US); Sally Dagher, Auburn Hills, MI (US); Steven Marshall, Auburn Hills, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 314 days.

(21) Appl. No.: 16/708,944

(22) Filed: Dec. 10, 2019

(65) Prior Publication Data

US 2021/0170830 A1 Jun. 10, 2021

(51) Int. Cl.
*B60H 1/00* (2006.01)

(52) U.S. Cl.
CPC ..... *B60H 1/00978* (2013.01); *B60H 1/00835* (2013.01)

(58) Field of Classification Search
CPC ............ B60H 1/00835; B60H 1/00842; B60H 1/00857; B60H 1/00871
USPC ........................... 454/75, 152, 155, 159–161
See application file for complete search history.

(56) References Cited

U.S. PATENT DOCUMENTS

| 6,607,029 B2* | 8/2003 | Danieau ............ B60H 1/00021 165/203 |
| 2003/0010474 A1 | 1/2003 | Araki et al. |
| 2009/0013706 A1* | 1/2009 | Sato ................... B60H 1/00664 62/239 |

(Continued)

FOREIGN PATENT DOCUMENTS

| JP | H10-035255 A | 2/1998 |
| JP | 2019-069727 A | 5/2019 |

(Continued)

OTHER PUBLICATIONS

International Preliminary Report on Patentability in corresponding International Application No. PCT/US2020/063771, dated Jun. 23, 2022 (6 pages).

*Primary Examiner* — Ko-Wei Lin
(74) *Attorney, Agent, or Firm* — Osha Bergman Watanabe & Burton LLP

(57) ABSTRACT

A heating, ventilation, and air-conditioning (HVAC) assembly for managing air mixing door kinematics of a motor vehicle is disclosed. The assembly includes a first door configured for allowing passage of a first air flow, a second door configured for allowing passage of a second air flow, obtaining means configured to obtain a temperature command indicating a target temperature for a passenger cabin, identifying means configured to identify a pattern of non-linear door kinematics for mixing the first air flow and the second air flow based on the temperature command, coordinating means configured to coordinate the non-linear door kinematics between the first door and the second door, and mixing means configured to mix the first air flow and the second air flow.

20 Claims, 11 Drawing Sheets

(56) References Cited

U.S. PATENT DOCUMENTS

| | | | | |
|---|---|---|---|---|
| 2010/0087133 A1* | 4/2010 | Kleinow | ............ | B60H 1/00857 |
| | | | | 454/152 |
| 2015/0017899 A1* | 1/2015 | Kim | .................. | B60H 1/00785 |
| | | | | 454/75 |
| 2017/0305233 A1 | 10/2017 | Spryshak | | |
| 2019/0061469 A1* | 2/2019 | Hirata | ...................... | B60H 1/12 |

FOREIGN PATENT DOCUMENTS

| KR | 10-2008-0065377 A | 7/2008 |
|---|---|---|
| KR | 101801230 B1 | 11/2017 |

* cited by examiner

HEATING, VENTILATION, AND AIR CONDITIONING (HVAC) ASSEMBLY FOR MANAGING AIR MIXING DOOR KINEMATICS AND METHOD FOR MANAGING THE SAME

BACKGROUND

In the automotive field, heating, ventilation, and/or air conditioning (HVAC) systems regulate the aerothermal parameters of the air circulated inside a passenger cabin. Air inlets are devices performing the functionality of allowing air flows from one area to another. The air inlets are opened and/or closed following a linear pattern. As such, the air inlets mix air flows opening all air inlets at a same time.

SUMMARY

In general, in one aspect, embodiments disclosed herein relate to a heating, ventilation, and air-conditioning (HVAC) assembly for managing air mixing door kinematics of a motor vehicle. The assembly includes a first door configured for allowing passage of a first air flow, a second door configured for allowing passage of a second air flow, obtaining means configured to obtain a temperature command indicating a target temperature for a passenger cabin, identifying means configured to identify a pattern of non-linear door kinematics for mixing the first air flow and the second air flow based on the temperature command, coordinating means configured to coordinate the non-linear door kinematics between the first door and the second door, and mixing means configured to mix the first air flow and the second air flow. The non-linear door kinematics include at least one delay value that determines a difference in actuation between the first door and the second door. The identifying means and the coordinating means dynamically modify the non-linear door kinematics based on immediate changes to the temperature command.

In general, in one aspect, embodiments disclosed herein relate to a method for managing air mixing door kinematics in a heating, ventilation, and air-conditioning (HVAC) assembly. The method includes obtaining a temperature command indicating a target temperature for a passenger cabin, identifying a pattern of non-linear door kinematics for mixing two or more air flows based on the temperature command, coordinating the non-linear door kinematics between at least a first door and a second door, each door regulating a corresponding hot air flow or a corresponding cold air flow, mixing the corresponding hot air flow and the corresponding cold air flow, and dynamically modifying the non-linear door kinematics based on immediate changes to the temperature command. The non-linear door kinematics include at least one delay value that determines a difference in actuation between the first door and the second door.

In general, in one aspect, embodiments disclosed herein relate to a heating, ventilation, and air-conditioning (HVAC) assembly for managing air mixing door kinematics of a motor vehicle. The assembly includes a first door configured for allowing passage of a first air flow, a second door configured for allowing passage of a second air flow, a third door configured for allowing passage of a third air flow, obtaining means configured to obtain a temperature command indicating a target temperature for a passenger cabin, identifying means configured to identify a pattern of non-linear door kinematics for mixing the first air flow and the second air flow based on the temperature command, coordinating means configured to coordinate the non-linear door kinematics between the first door, the second door, and the third door, and mixing means configured to mix the first air flow, the second air flow, and the third air flow. The non-linear door kinematics comprise at least one delay value that determines a difference in actuation between the first door and the second door and the third door. The identifying means and the coordinating means dynamically modify the non-linear door kinematics based on immediate changes to the temperature command.

Other aspects of the disclosure will be apparent from the following description and the appended claims.

DETAILED DESCRIPTION

Figure 1:
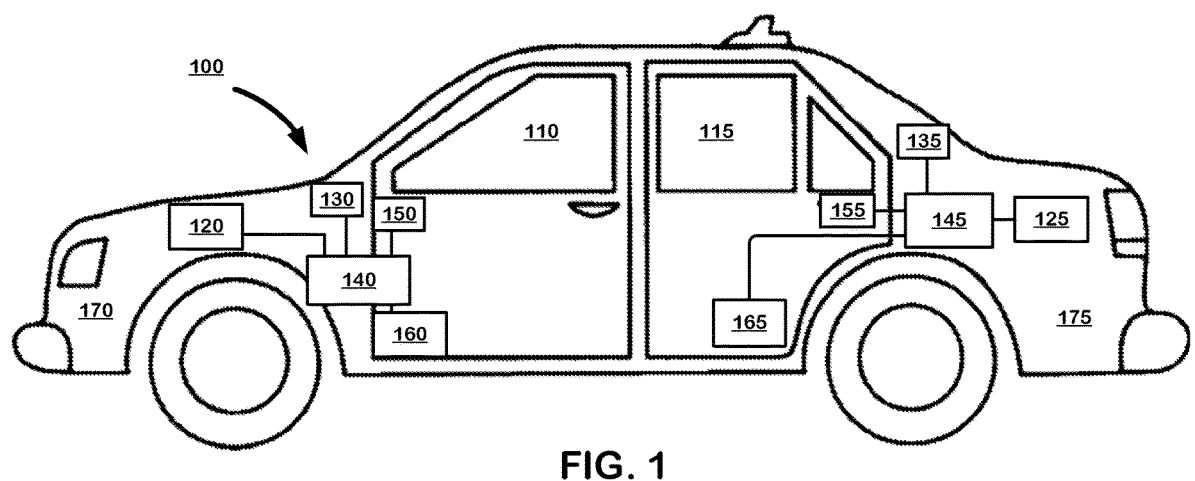
FIG. 1 shows a block diagram of an automotive system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include methods, assemblies, and systems directed to managing air mixing door kinematics for an HVAC assembly by inserting a delay between the opening of a specific door and the opening of other doors. In one or more embodiments, an HVAC assembly may be configured for operating in a partial mixing mode allowing passage of hot air flow before allowing passage of cold air flow. Similarly, in one or more embodiments, the HVAC assembly may be configured for operating in the partial mixing mode allowing passage of the cold air flow before allowing passage of the hot air flow. The HVAC system configuration may be useful in cold weather by circulating air in response to a temperature command requesting warming up, or in hot weather by circulating air in response to the temperature command requesting cooling down, or based on the parameters indicating immediate changes of the speed and the temperature surrounding the motor vehicle. As such, door kinematics may be coordinated for preventing an unwanted rush of the hot air flow or the cold air flow blasting into the HVAC assembly and air leakage. Thus, maintaining a constant temperature in a passenger cabin may be achieved by coordinating mixing air door kinematics in the HVAC assembly using the inserted delay.

FIG. 1 shows a block diagram of motor vehicle system in accordance with one or more embodiments. Specifically, FIG. 1 shows a heating, ventilation, and air-conditioning (HVAC) system (100) for a motor vehicle according to one or more embodiments, having various equipment that is powered during regular operation of the motor vehicle. The HVAC system (100) may be a split HVAC system configured to connect two HVAC subassemblies for the HVAC system (100) to operate. The HVAC system (100) may be a single system installed at the front or at the back of a motor vehicle. Additionally, the HVAC system (100) may be one system divided between two parts, one located at the front and another one located at the back of the motor vehicle. In one or more embodiments, a system, or sub-system, located at the front of the vehicle may include the same elements mirrored in the back of the vehicle. In one or more embodiments, the motor vehicle may be divided into two areas: an area outside passenger compartments (170, 175) and an area inside passenger compartments (110, 115). Furthermore, the system may include a distribution controller (120, 125), an airflow space (130, 135), a blower motor (140, 145), an evaporator (150, 155), and a heater core (160, 165). Those skilled in the art will appreciate that the configuration of FIG. 1 is not limited to that which is shown, and that one or more of the above-mentioned components may be combined or omitted.

The area outside passenger compartments (170, 175) may be any area that a passenger does not have access to through regular use of the motor vehicle. As such, these areas may include under and above the motor vehicle, under the hood at the front of the motor vehicle, or in the trunk at the back of the motor vehicle. This area may be larger in larger vehicles or vehicles that do not require a conventional engine, such as is the case with electric motor vehicles. In a hatchback vehicle, or a vehicle with the back or front exposed to the driver, this area may be considered as any area beyond the dashboard at the front or any area behind the back seats at the back.

The area inside passenger compartments (110, 115) may be any area that any passenger has access to at any point through regular use of the motor vehicle. For example, this area may include any area from the dashboard towards the direction of the driver and any area from the back seats towards the front of the car.

The system may include a blower motor (140, 145) hardware configured to produce regulated burst of rotational force to activate subsequent motors or directly impact flow of air in the airflow chamber and the airflow space (130, 135). For example, the blower motor (140, 145) may be considered a device for enabling a fan to push hot/cold air in/out of the area inside passenger compartments (110, 115).

The airflow space (130, 135) may be hardware configured for transporting airflow inside/outside the motor vehicle. In the HVAC system (100), these components may circulate air in/out of the motor vehicle while avoiding impacting shifting in weights. For example, the airflow space (130, 135) may be coupled to the evaporator (150, 155) and the heater core (160, 165) for moving an airflow through the motor vehicle.

The evaporator (150, 155) and the heater core (160, 165) may be one or more elements of an electric radiator that exchanges heat with at least one fluid to change a temperature level in the distributed airflow.

The distribution controller (120, 125) may be a processor or a human-machine interface though which the blower motor (140, 145) is controlled. The distribution controller (120, 125) may be a processor coupled with motors connected to air inlets for distributing airflow in/out the motor vehicle. Further, the distribution controller (120, 125) may control and regulate the use of the evaporator (150, 155) and the heater core (160, 165). For example, the air inlets may be fresh air inlets and recycled air inlets configured to combine mixed air for maintenance of a pressure or a temperature inside a passenger cabin of a motor vehicle. The distribution controller (120, 125) may be coupled to one or more electronic components configured to dynamically modify the aperture of the various air inlets. These means may be electronic components configured for synthesizing and actuating motors coupled to one or more flaps for dynamically modifying an aperture on one or more of the air flaps. In one or more embodiments, these means are subassemblies including sensors connected to the distribution controller (120, 125) that sends out data, or commands to an actuator of a specific air flap. As such, the means may be an Engine Control Unit (ECU) of a motor vehicle. The air inlets and their respective combinations are described in more detail in FIGS. 3-11 below.

The HVAC system (100) may be assembled in at least two distinct subassemblies. As such, the above-referenced elements of the HVAC system (100) may be distributed in one or both of the subassemblies. For example, in one or more embodiments, the evaporator (150, 155) and the blower motor (140, 145) may be part of a first subassembly of the HVAC system (100), located outside of the passenger compartment of the motor vehicle, while the heater core (160, 165) and the distribution controller (120, 125) may be part of a second subassembly of the HVAC system, located inside the passenger compartment of the motor vehicle. Those skilled in the art will appreciate that embodiments disclosed herein are not limited to the aforementioned example of distribution of elements across subassemblies and that these elements may be located in either subassembly without departing from embodiments disclosed herein.

The area outside of the passenger compartment and the area inside the passenger compartment may be split by a wall (not shown). The wall may be, in one or more embodiments, a metal sheet associated with the dashboard (not shown in FIG. 1) of the motor vehicle.

Figure 2:
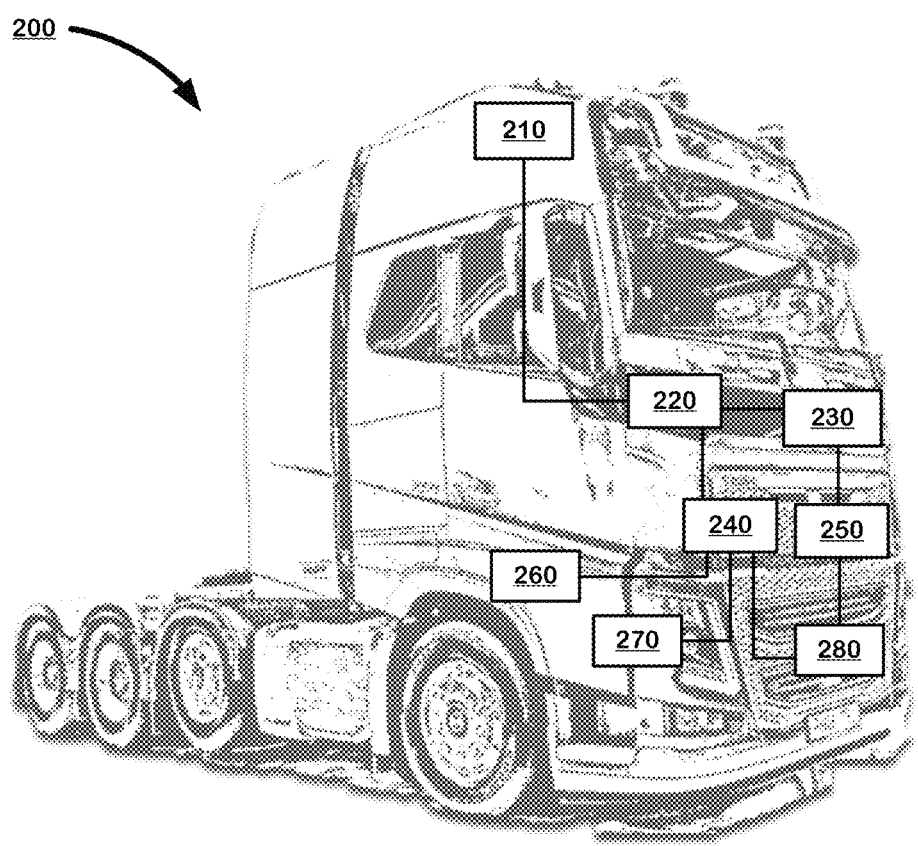
FIG. 2 shows a block diagram of an automotive system in accordance with one or more embodiments.

Turning to FIG. 2, FIG. 2 shows a block diagram of an automotive system in accordance with one or more embodiments. FIG. 2 shows an extended HVAC system (200) for a heavy motor vehicle such as a truck according to one or more embodiments having various equipment that is powered during regular operation of the heavy motor vehicle. The extended HVAC system (200) may be one system divided between two parts, one located at the front and another one located at the back of the heavy motor vehicle, or one located at the top and another one located at the bottom of the heavy motor vehicle. In one or more embodiments, a system, or sub-system, located at the front of the vehicle may include the same elements mirrored in the back of the heavy motor vehicle. In one or more embodiments, the heavy motor vehicle is a truck and may include one or more sensing elements (210, 230, 250), a distribution controller (220), a blower motor (240), an evaporator (260), a heater core (270), and an airflow space (280).

The system may include one or more sensing elements (210, 230, 250), which may be hardware configured to evaluate surrounding areas inside/outside the heavy motor vehicle and provide feedback relating to physical phenomena. In one or more embodiments, the one or more sensing elements (210, 230, 250) may be a first sensing element (210), a second sensing element (230), and a third sensing element (250). The one or more sensing elements (210, 230, 250) may operate individually or in cooperation with one another to provide a distribution controller (220) with information relating to the physical phenomena. The one or more sensing elements (210, 230, 250) may be hardware sensors for sensing/measuring the vehicle environment, such as object detection sensors, temperature sensors, distance sensors, etc. For example, the one or more sensing elements (210, 230, 250) may aid in a self-driving operation of the heavy motor vehicle. In one or more embodiments, the one or more sensing elements (210, 230, 250) may provide a driver with visual/audio signals relating to the surrounding areas of the heavy motor vehicle. Furthermore, the one or more sensing elements (210, 230, 250) may be part of an autonomous operating system that determines various temperature values for the inside of the cabin in the heavy motor vehicle.

The distribution controller (220) may be a processor or a human-machine interface though which the blower motor (240) and the one or more sensing elements (210, 230, 250) are controlled. The distribution controller (220) may be a processor coupled with motors connected to air inlets for distributing airflow in the heavy motor vehicle. Further, the distribution controller (220) may control and regulate the use of the evaporator (260) and the heater core (270).

The blower motor (240) may be hardware configured to produce regulated burst of rotational force to activate subsequent motors or directly impact flow of air in the airflow chamber and the airflow space (280). For example, the blower motor (240) may be considered a device for enabling a fan to push hot/cold air in/out of the area inside a passenger compartment.

The evaporator (260) and the heater core (270) may be one or more elements of an electric radiator that exchanges heat with at least one fluid to change a temperature level in the distributed airflow. In one or more embodiments, the evaporator (260) and the heater core (270) may be assembled during a manufacturing process and the evaporator (260) and the heater core (270) may be afterwards installed within the heavy motor vehicle as part of the extended HVAC system (200). In one or more embodiments, the evaporator (260) and/or the heater core (270) may be serviced through the passenger compartment and without uninstalling any other parts of the extended HVAC system (200).

The airflow space (280) may be hardware configured for transporting airflow inside/outside the heavy motor vehicle through one or more air inlets. In the extended HVAC system (200), this component may circulate air in/out of the motor vehicle while avoiding impacting shifting in weights. For example, the airflow space (280) may be coupled to the evaporator (260) and the heater core (270) for moving an airflow through the motor vehicle. Further, the air inlets may be located both towards an outside and towards an inside of the heavy motor vehicle for providing fresh air and recycled air. The air inlets may be configured for combining different positions based on preset configurations or dynamic adaptive modes. The combinations of air inlets and their respective combinations are described in more detail in FIGS. 3-11 below.

The extended HVAC system (200) may be assembled in at least two distinct subassemblies. As such, the above-referenced elements of the extended HVAC system (200) may be distributed in one or both of the subassemblies. For example, in one or more embodiments, the evaporator (260) and the blower motor (240) may be part of a first subassembly of the extended HVAC system (200), located outside of the passenger compartment of the motor vehicle, while the heater core (270) and the distribution controller (220) may be part of a second subassembly of the HVAC system, located inside the passenger compartment of the motor vehicle. Those skilled in the art will appreciate that embodiments disclosed herein are not limited to the aforementioned example of distribution of elements across subassemblies and that these elements may be located in either subassembly without departing from embodiments disclosed herein.

Figure 3:
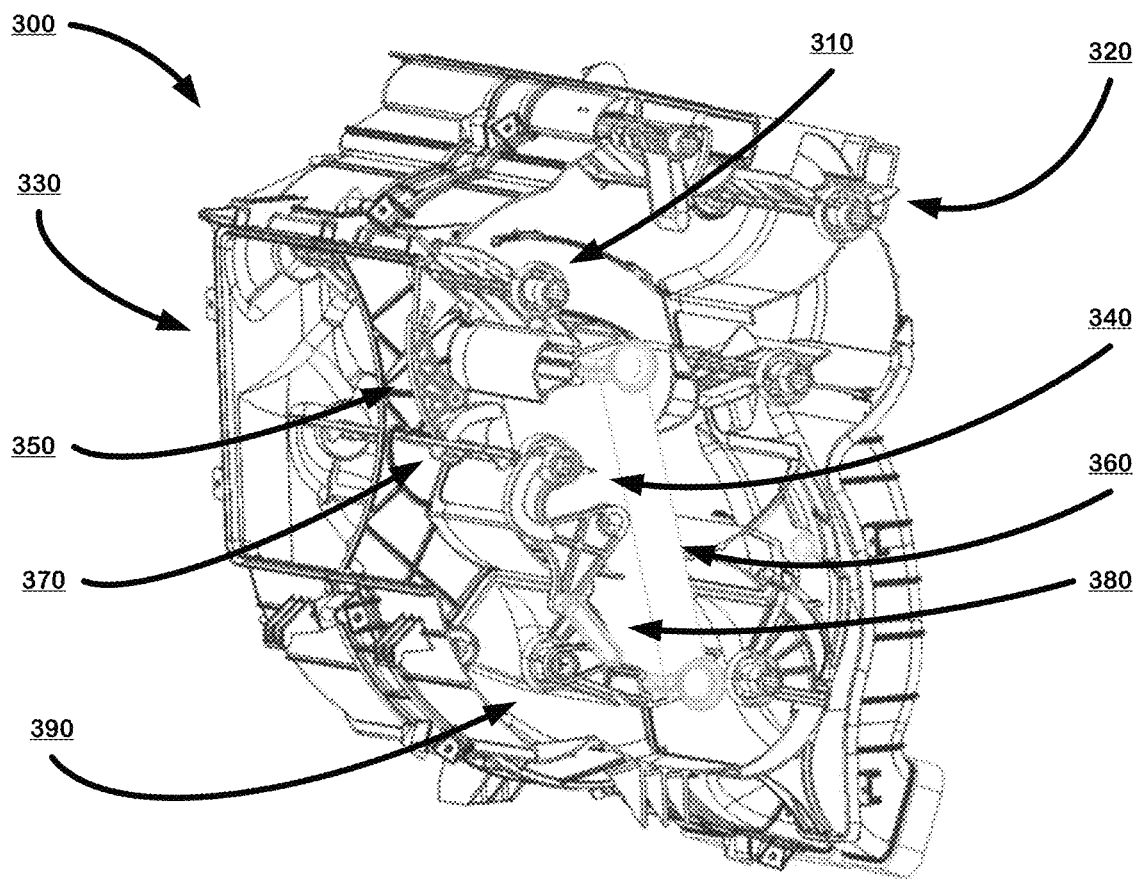
FIG. 3 shows an HVAC assembly in accordance with one or more embodiments.

Turning to FIG. 3, FIG. 3 shows a perspective view of an HVAC assembly in accordance with one or more embodiments. As shown in FIG. 3, the HVAC assembly (300) may be a combination of various subassemblies assembled in a direction of insertion within a motor vehicle. The HVAC assembly (300) may include an upper door (310) coupled to at least one passenger cabin door (320) and an air flow passageway (330). The HVAC assembly (300) may include a heat exchanger (360) coupled through an air flow passage to a middle door (370). The HVAC assembly (300) may include the upper door (310) coupled to the middle door (370) through obtaining means (350). Similarly, a lower door (390) coupled to the middle door (370) through coordinating means (380). Further, the lower door (390) may be coupled to the middle door (370) through identifying means (340). In particular, all doors in the HVAC assembly (300) may be managed for positioning from a closed position to an open position.

In one or more embodiments, the upper door (310) is an air intake configured for controlling intake air velocity by increasing or reducing a cross-section area of the air flow passageway (330). To this point, a door may be hardware and software configured at an entry in a casing comprising the HVAC assembly. For example, the door may be a slot, a mouth, a passage, a hole or any suitable aperture in the casing through which air can flow inside, and outside, the casing. As such, doors may be air flaps corresponding to rotating members that open, or close, a hole in the HVAC. As such, when the upper door (310) is open, air flow from the air flow passageway (330) may go through the upper door (310) and towards the passenger cabin door (320). The upper door (310) may move independently from the movements of the middle door (370) or the lower door (390).

Alternatively, the upper door (310) may move in coordination with the movements of the middle door (370) or the lower door (390). To this point, the upper door (310) may be coupled to obtaining means (350) that control the movement of the upper door (310) with respect to the middle door (370) and the lower door (390).

In one or more embodiments, a passenger cabin door (320) is an aperture that allows air from outside of a passenger cabin to be transported into the passenger cabin or back inside the passenger cabin at a different air pressure or at a different temperature. The passenger cabin door (320) may be disposed at an upper position or a lower position for receiving an air flow allowed through by one or more of the upper door (310), the middle door (370), and the lower door (390).

In one or more embodiments, an air flow passageway (330) is an aperture that allows air from inside of a passenger cabin, air from outside the passenger cabin, or a combination of both, to be transported to the passenger cabin at a different air pressure or at a different temperature. The air flow passageway (330) includes access to various doors which regulate a flow of air through the upper door (310), the middle door (370), and the lower door (390).

In one or more embodiments, identifying means (340) may be hardware and software configured to effectively determining the position of one door with respect to another. The identifying means (340) are attached to one or more of the various doors. Similarly, the identifying means (340) may include connectors for assembling to the HVAC assembly. The identifying means (340) may rotate about an axis of rotation in which the aperture of one or more of the various doors may be selected. In particular, the identifying means (340) may be rotated about the axis of rotation in a clockwise direction or in a counter-clockwise direction. Further, the identifying means (340) may determine a pattern of non-linear door kinematics for mixing two or more air flows. The identifying means (340) may perform identifying using precision mechanical or electronic components. As such, the aperture of the upper door (310), the middle door (370), and/or the lower door (390) may be incorporated in a sequence that directly relates to the identified pattern. The pattern may further include opening or closing of the various doors determined to a degree of precision. In one or more embodiments, a degree of aperture may be an angle between 0 degrees to 180 degrees. In particular, given the rotational nature of the various doors, an opening of one end of a door may concurrently provide an equivalent rotation on another end of the door. Further, the identifying means (340) may be one or more sensors configured for determining the position of the doors. For example, the identifying means may be an internal link cam or another electromechanically movement tracker coupled to the upper door (310), the middle door (370), and the lower door (390).

The obtaining means (350) may be hardware and software coupled with the coordinating means (380) that is configured to adjust dynamically corresponding degrees of aperture to maintain a mixed air pressure in the motor vehicle. In one or more embodiments, the mixed air pressure is a preset air pressure that may be pre-configured for a specific circumstance or the mixed air pressure is an air pressure determined upon immediate analysis of one or more parameters inside a passenger cabin of the motor vehicle or outside the motor vehicle. As such, the mixed air pressure may be a combination of a pressure obtained from the various doors. In addition, the mixed air pressure may be a required mixed air pressure to be obtained in a given time. In this event, the combination of proportional pressures from the various doors may be coordinated by the coordinating means (380) and supervised by the obtaining means (350). In particular, a deficit or surplus of mixed air pressure from a current mixed air pressure to the required mixed air pressure may be a compensation mixed air pressure generated by combining air flows from one or more of the various doors. To this point, the required mixed air pressure may be attained by heating or cooling the mixed air implementing the electronic actuation of a heat exchanger (360).

In one or more embodiments, the obtaining means (350) are hardware and software configured to obtain a temperature command based on a rule or business logic indicating a target temperature of a passenger cabin, a current temperature of the passenger cabin, an outside temperature, and/or a function representative of the target temperature of the passenger cabin, the current temperature of the passenger cabin, and the outside temperature. As such, the obtaining means (350) and the identifying means (340) may evaluate one or more parameters associated with the temperature command. To this point, the obtaining means (350) may obtain at least one result from the evaluated one or more parameters.

In one or more embodiments, the obtaining means (350) may be coupled to the coordinating means (380) and mixing means (not shown, but located behind the various doors in FIG. 3) configured to mix one or more air flows. The mixing means may be one or more engagement pockets arranged cooperatively with respect to the coordinating means (380). The obtaining means (350) and the identifying means (340) may determine the immediate changes to the temperature command and the rule based on the at least one result of the results obtained. To this point, the obtaining means (350) and the identifying means (340) may update the non-linear air inlet kinematics based on the immediate changes to the temperature command and the rule. Thus, the obtaining means (350) may be an Engine Control Unit (ECU) of the motor vehicle coupled to at least one internal link cam.

In one or more embodiments, the middle door (370) is an air intake configured for receiving air flow for mixing a hot air flow and a cold air flow. More specifically, the middle door (370) is an air intake configured for controlling intake air velocity by increasing or reducing the cross-section area of the air flow passageway (330). As such, the middle door (370) may be moved in coordination with the movement of the upper door (310) via the obtaining means (350) and the coordinating means (380). The middle door (370) may include attachments for engaging the obtaining means (350) and the identifying means (340).

In one or more embodiments, the coordinating means (380) are attached to one or more of the various doors for effectively coordinating the movement of one door with respect to another in the HVAC assembly. The coordinating means (380) allow non-linear door kinematics to implement one or more delays that enable implementing the pattern identified by the identifying means (340). The delay may be a calculated value that determines a difference in actuation between the various doors. Further, the coordinating means may coordinate the non-linear kinematics between the various doors. To this point, the coordinating means include various links and levers interconnected with the various doors.

In one or more embodiments, the lower door (390) is an air intake configured for receiving air flow for mixing a hot air flow and a cold air flow. The lower door (390) is an air intake configured for controlling intake air velocity by increasing or reducing the cross-section area of the air flow passageway (330). As such, the lower door (390) may be moved in coordination with the movement of the upper door (310) and the middle door (370) via the obtaining means (350), the identifying means (340), and the coordinating means (380). The lower door (390) may include attachments for engaging the coordinating means (380).

In one or more embodiments the parameters may be evaluated to dynamically adjust the rotatable position of the various doors. The various doors being configured for rotating simultaneously and/or independent from one another and including the delay. As such, the various doors may be rotated at different speeds, in different directions about their respective axis of rotation, and in response, or irrespective of, one or more parameters inside/outside a passenger cabin of the motor vehicle.

In one or more embodiments, the heat exchanger (360) is a radiator component configured to increase the air temperature and pressure in a mixed air chamber from the air flow passageway (350). Further, the heat exchanger (360) may be a heater core or an evaporator based on a predetermined configuration. In one or more embodiments, the heat exchanger (360) may be disposed subsequent to the positioning of the middle door (370) by coupling a heater core in an environment sealed with air flow obtained from the air flow passageway (350) and before the mixed air chamber. As such, there may be a direct path for air to flow from the air flow passageway (350) to the heater exchanger (360) and from the heater exchanger (360) to the mixed air chamber (not shown, but behind heater exchanger (360) in FIG. 3). As such, air flow supplied by the air flow passageway (350) may be warmed up into the mixed air chamber.

Figure 4:
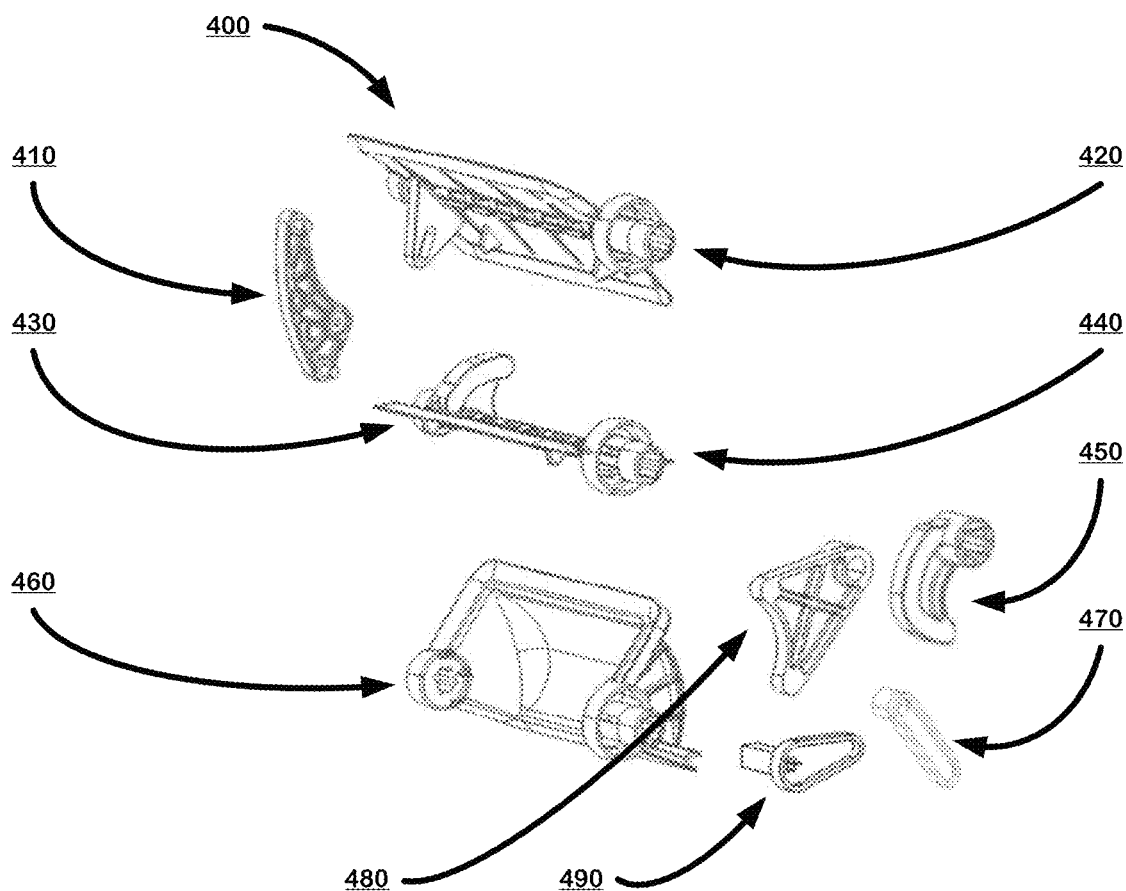
FIG. 4 shows an HVAC assembly in accordance with one or more embodiments.

Turning to FIG. 4, FIG. 4 shows a piecewise view of an HVAC subassembly in accordance with one or more embodiments. As shown in FIG. 4, the HVAC subassembly (400) may include all of the elements described in relation to FIG. 3. Specifically, the HVAC subassembly (400) may include an upper door (420), a middle door (430), a lower door (460). The HVAC subassembly (400) may further include obtaining means. The HVAC subassembly (400) may further include coordinating means, such as forward lever (470) and backward lever (490). The HVAC subassembly (400) may further include identifying means. The various doors may include one or more connectors for coupling the various doors to various means, such as middle connector (440).

In one or more embodiments, the HVAC subassembly (400) of FIG. 4 may be arranged in different locations inside an HVAC assembly. Thus, the various elements described with respect to FIG. 4 may perform all the functions described in FIG. 3, but placed at different locations in the HVAC assembly for dynamically moving the doors from a closed position to an open position, or from the open position to the closed position. To this point, the various doors may be moved by a same or different actuators that implement the at least one delay at one door with respect to the others. In one or more alternate embodiments, the delay may be implemented solely mechanically, through the forward lever (470) and the backward lever (490) without the use of sensors or other electronics.

Figure 5:
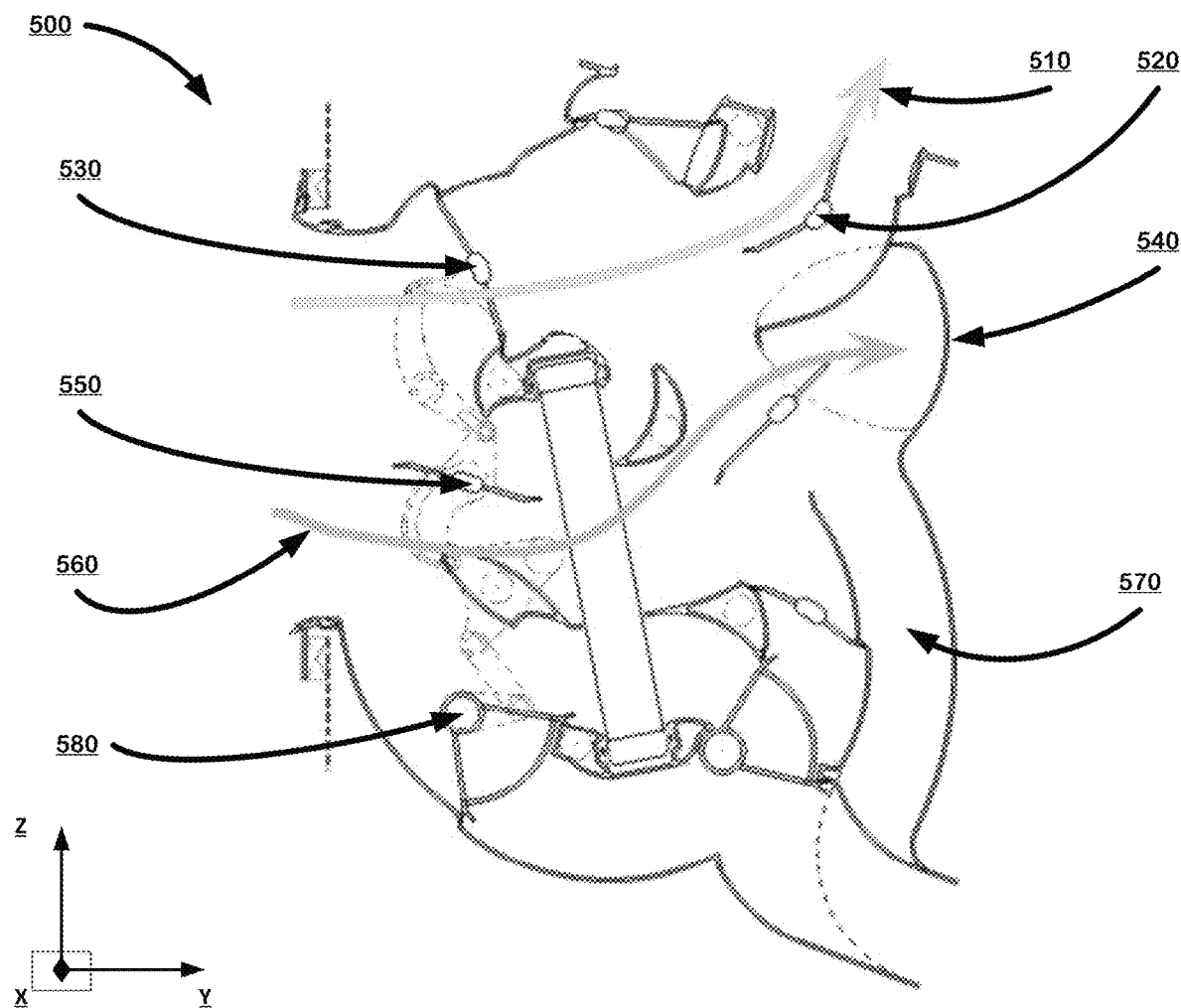
FIG. 5 shows an example of an HVAC assembly in accordance with one or more embodiments.
Figure 6:
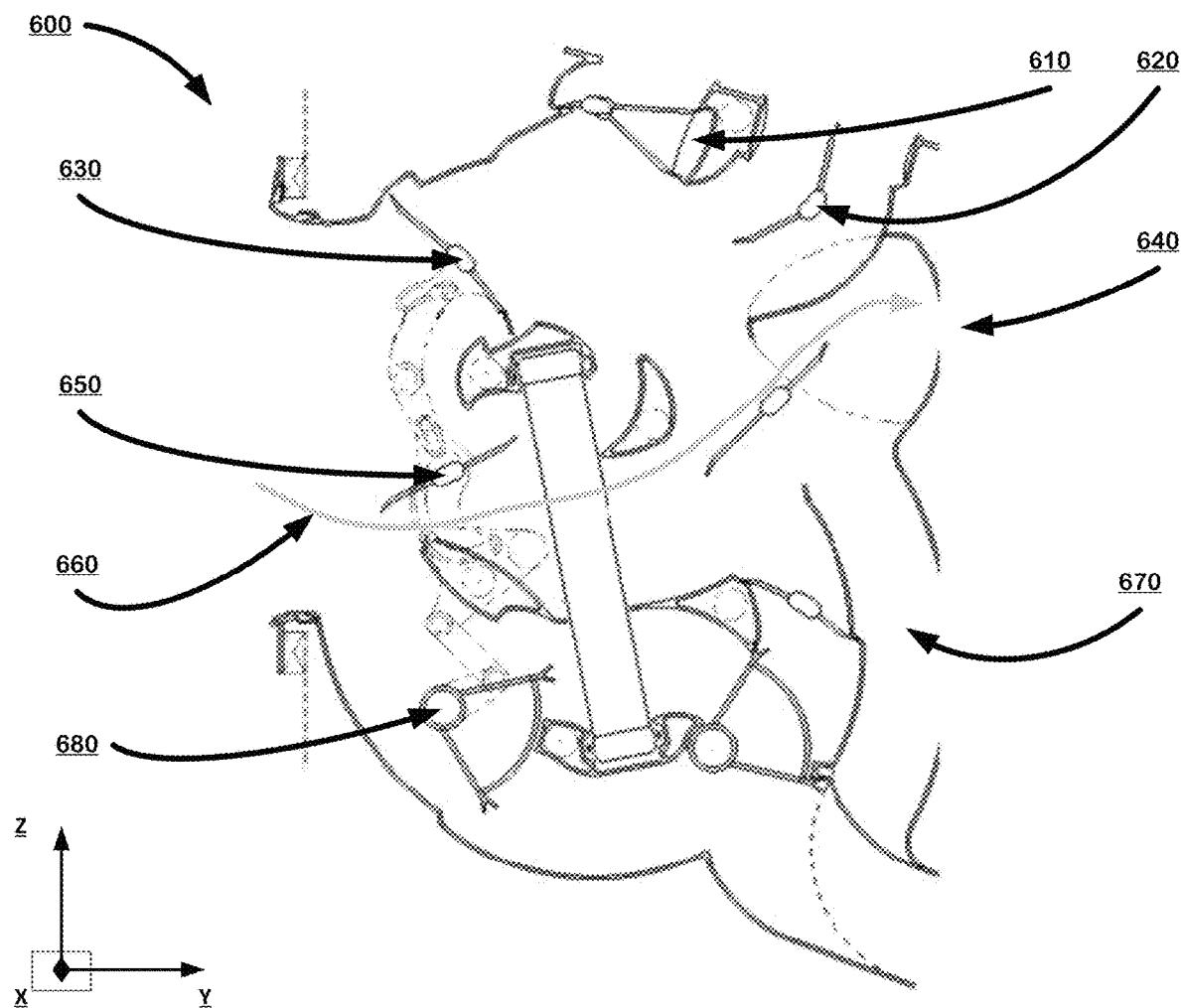
FIG. 6 shows an example of an HVAC assembly in accordance with one or more embodiments.
Figure 7:
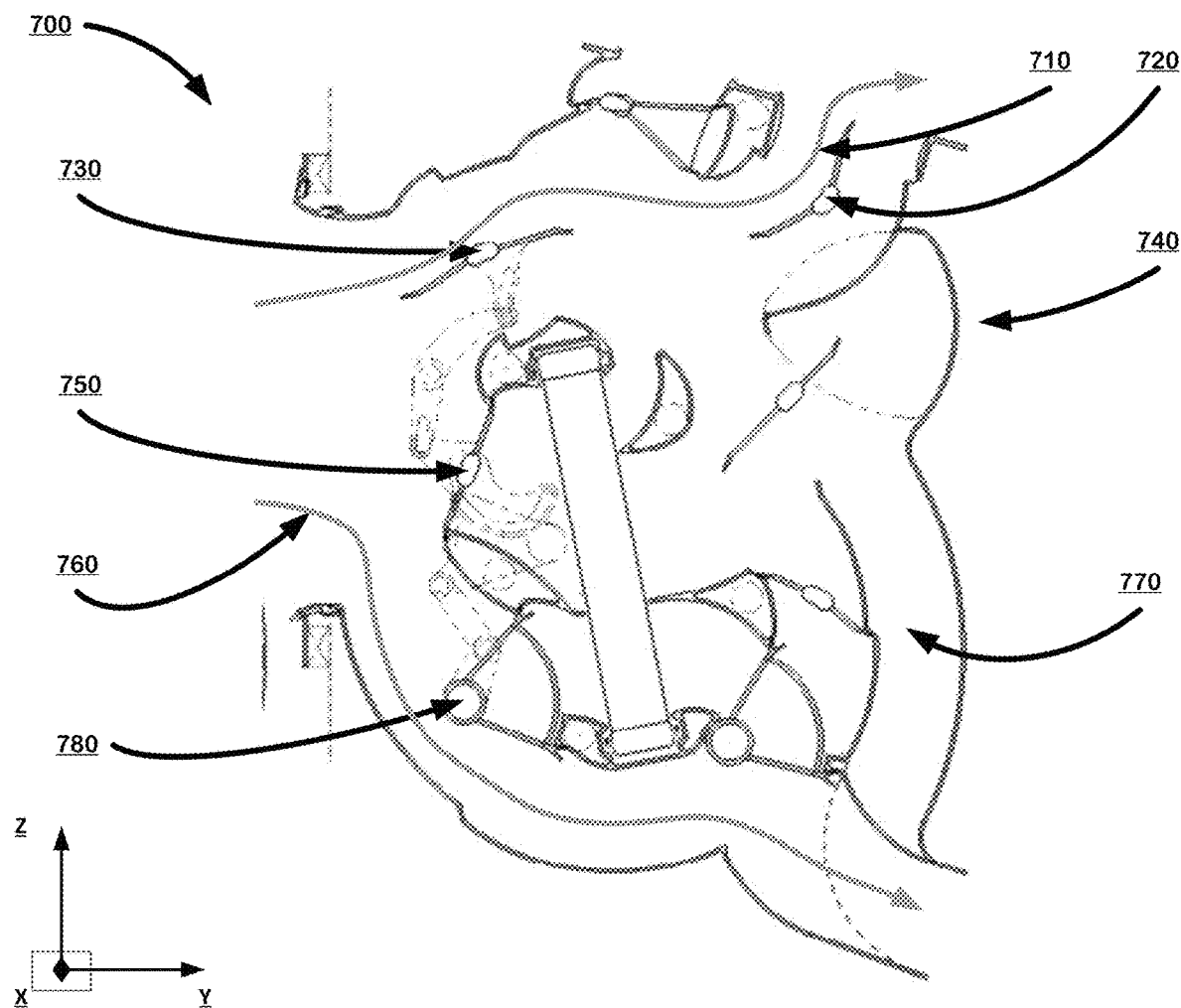
FIG. 7 shows an example of an HVAC assembly in accordance with one or more embodiments.

FIGS. 5-7 show cross-sectional views of an HVAC assembly in accordance with one or more embodiments. For example, FIGS. 5-7 may be cross-sectional views of the HVAC assembly (300) described with respect to FIG. 3 or cross-sectional views of the HVAC subassembly (400) described with respect to FIG. 4. These cross-sectional views are side views of an HVAC assembly from a direction along the X-axis. To this point, the dotted lines in FIGS. 5-7 represent the respective location of one or more of the obtaining, identifying and/or coordinating means described in FIGS. 3 and 4 and positioned before or after a cross-sectional plane on the same direction.

Turning to FIG. 5, FIG. 5 shows an HVAC assembly (500) may include an upper door (530) before a passenger cabin door (520). Further, the HVAC assembly (500) may include a middle door (550) positioned before a heat exchanger. Similarly, the HVAC assembly (500) may include a lower door (580) positioned below the rest of the doors in a direction along a Z-axis. In one or more embodiments, the upper door (530), the middle door (550), and the lower door (580) are disposed after an air flow passageway for controlling air flow to a mixed air pocket (540), a mixed air chamber (570), and a passenger cabin.

In one or more embodiments, the HVAC assembly (500) may be configured to start at a sealed off, or closed mode. In particular, the HVAC assembly (500) may be configured to revert to the closed mode upon powering down of the HVAC assembly (500). As such, the HVAC assembly (500) may remain in a closed mode for shipment or storage. In an event that the HVAC assembly (500) is assembled onto a motor vehicle, the motor vehicle may power down the HVAC assembly (500) at which point the upper door (530), the middle door (550), and the lower door (580) may revert to the closed mode. Further, in one or more embodiments, the closed mode prevents any fresh air or recycled air from entering the air flow passageway and from reaching the heat exchanger and the mixed air chamber (570).

In one or more embodiments, the HVAC assembly (500) may be configured for allowing dynamic air flow to the mixed air pocket (540), the mixed air chamber (570), and the passenger cabin. For example, the HVAC assembly (500) may dynamically interpret one or more parameters associated to the inside of a passenger cabin to determine that the HVAC assembly is to be configured into an open mode. The open mode may be a mode in which air is transporter from the air flow passageway. In an event when the passenger cabin is required to reach a temperature higher than a current temperature (e.g., to warm up a car), the kinematics of the various doors may be coordinated to allow flow of a hot air flow (560) before allowing flow of a cold air flow (510). To this point, a delay may be implemented as described in FIGS. 3 and 4 to enable the mixed air pocket (540) and the mixed air chamber (570) to receive hot air flow (560) only. Further, following the delay, the cold air flow (510) may join the hot air flow (560) and push a mixture of air flows into the passenger cabin through the passenger cabin door (520). In the configuration described above, the cold air flow (510) follows a less restrictive path for cold air when the doors open from a full head position. As such, if the upper door (530) lags instead of suddenly opening, a temperature drop may be avoided. Similarly, in the configuration described above, the hot air flow (560) may travel more coming from a full heat configuration.

Turning to FIG. 6, FIG. 6 shows a cross-section view of an assembly in accordance with one or more embodiments. For example, FIG. 6 may be a cross-section of the HVAC assembly (300) described with respect to FIG. 3 or a cross-section of the HVAC assembly (400) described with respect to FIG. 4. As shown in FIG. 6, an HVAC assembly (600) may include an upper door (630) before a passenger cabin door (610). Further, the HVAC assembly (600) may include a middle door (650) positioned before a heat exchanger. Similarly, the HVAC assembly (600) may include a lower door (680) positioned below the rest of the doors in a direction along a Z-axis. In one or more embodiments, the upper door (630), the middle door (650), and the lower door (680) are disposed after an air flow passageway for controlling air flow to a mixed air pocket (640), a mixed air chamber (670), and a passenger cabin.

In one or more embodiments, the HVAC assembly (600) may be configured to rotate the upper door (630) after the middle door (650) is fully open at its maximum aperture. In particular, the HVAC assembly (600) may be configured to open the lower door (680) faster than the upper door (630). As such, the HVAC assembly (600) may remain in a mixed mode for the duration of the mixing door kinematics coordinated as described with respect to FIGS. 3 and 4.

In one or more embodiments, the HVAC assembly (600) may be configured for allowing dynamic air flow to the mixed air pocket (640), the mixed air chamber (670), and the passenger cabin. For example, the HVAC assembly (600) may dynamically interpret one or more parameters associated to the inside of a passenger cabin to determine that the HVAC assembly is to be configured into an mixed mode. The mixed mode may be a mode in which air is partially transporter from the air flow passageway. In an event when the passenger cabin is required to reach a temperature higher than a current temperature (e.g., to warm up a car), the kinematics of the various doors may be coordinated to allow flow of a hot air flow (660) before allowing flow of a cold air flow (not shown). To this point, a delay may be implemented as described in FIGS. 3 and 4 and in cascade between the various doors so one door is delayed with respect to another. The various doors may be delayed to further enable the mixed air pocket (640) and the mixed air chamber (670) to receive hot air flow (660) only for a large period of time. Further, following the delays, the cold air flow may join the hot air flow (660) and push a mixture of air flows into the passenger cabin through the passenger cabin door (610).

Turning to FIG. 7, FIG. 7 shows a cross-section view of an assembly in accordance with one or more embodiments. For example, FIG. 7 may be a cross-section of the HVAC assembly (300) described with respect to FIG. 3 or a cross-section of the HVAC assembly (400) described with respect to FIG. 4. As shown in FIG. 7, an HVAC assembly (700) may include an upper door (730) before a passenger cabin door (720). Further, the HVAC assembly (700) may include a middle door (750) positioned before a heat exchanger. Similarly, the HVAC assembly (700) may include a lower door (780) positioned below the rest of the doors in a direction along a Z-axis. In one or more embodiments, the upper door (730), the middle door (750), and the lower door (780) are disposed after an air flow passageway for controlling air flow to a mixed air pocket (740), a mixed air chamber (770), and a passenger cabin of the motor vehicle.

In one or more embodiments, the HVAC assembly (700) may be configured to rotate the upper door (730) to a fully open position after the middle door (750) is fully closed at its minimum aperture. In particular, the HVAC assembly (700) may be configured to open the lower door (780) faster than the upper door (730). As such, the HVAC assembly (700) may remain in a constant mode after the mixing door kinematics are coordinated as described with respect to FIGS. 3 and 4. FIG. 7 references an example in which the cabin is maintained cooled after the coordinating. A reverse process, or a combination of both, may be applied for maintaining the cabin warm after the coordinating.

In one or more embodiments, the HVAC assembly (700) may be configured for allowing dynamic air flow to the mixed air pocket (740), the mixed air chamber (770), and the passenger cabin. For example, the HVAC assembly (700) may dynamically interpret one or more parameters associated to the inside of a passenger cabin to determine that the HVAC assembly is to be configured into an mixed mode. The open mode may be a mode in which air is fully transporter from the air flow passageway after the mixed air pocket (740) and the mixed air chamber (770) are filled with mixed air at the mixed position. In an event when the passenger cabin is required to reach a temperature lower than a current temperature (e.g., to cool down a car), the kinematics of the various doors may be coordinated to allow flow of a cold air flows (710) and (760) before allowing flow of a hot air flow (not shown). To this point, a delay may be implemented as described in FIGS. 3 and 4 and in cascade between the various doors so one door is delayed with respect to another. To this point, FIG. 7 may show a start position for starting cooling down towards a target temperature. The various door may be delayed to further enable the mixed air pocket (740) and the mixed air chamber (770) to receive cold air flows (710) and (760) only for a large period of time. Further, following the delays, the hot air flow may join the cold air flows (710) and (760) and push a mixture of air flows into the passenger cabin through the passenger cabin door (720). In the configuration described above, the cold air flows (710) and (760) follow a full cold configuration.

While one or more embodiments have been discussed with respect to "closed mode" and "open mode," a person of ordinary skill in the art would understand that the HVAC assemblies discussed in view of FIGS. 5-7 may be interchanged. As such, the various HVAC assemblies may be configured for dynamically interchanging modes upon receiving a command or upon identifying predetermined circumstances previously identified as triggers. In addition, disclosed mixing functions may be applied to single zone and multiple zone HVAC assemblies to optimize packaging direction along an X-axis and manage hot doors and cold doors opening ratio to meet linearity specifications. In addition, the HVAC assemblies discussed in view of FIGS. 3-7 allow design of the various doors to improve packaging flexibility to tune mixing of air flows with management of hot doors and cold doors opening relation/ratio.

Figure 8:
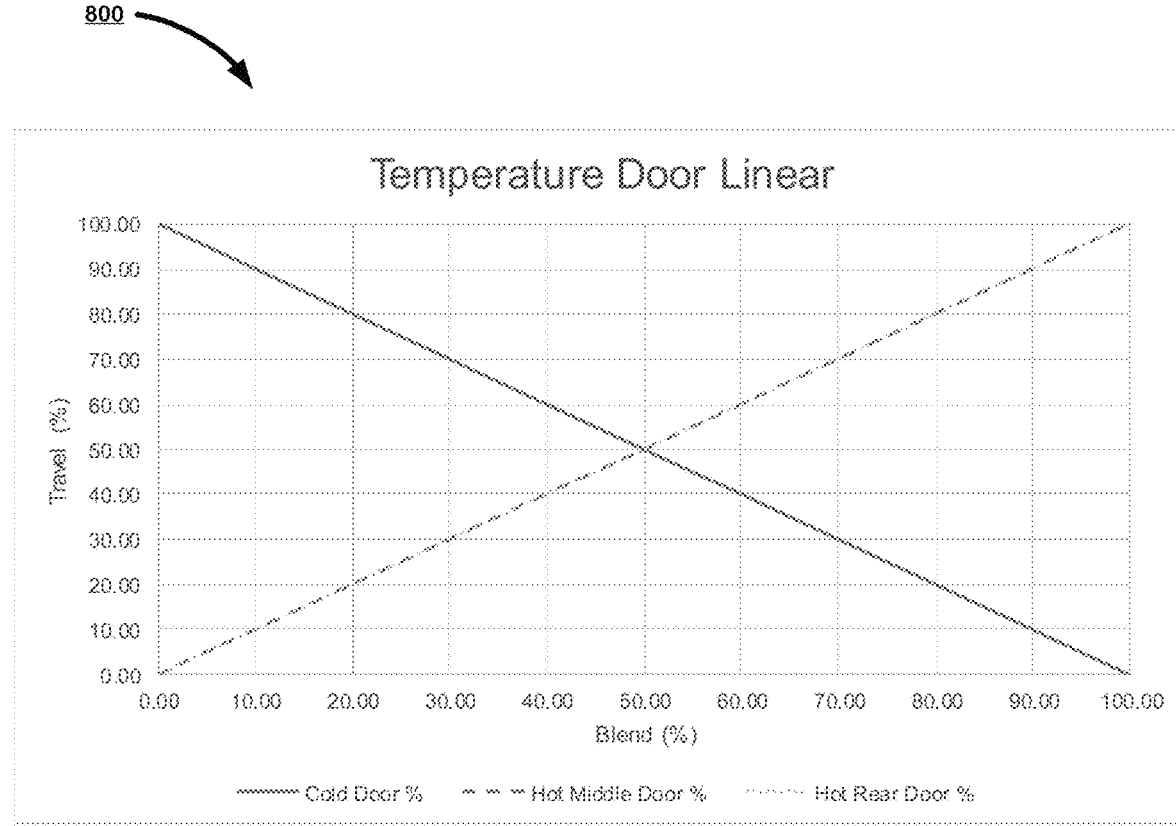
FIG. 8 shows a graph representative of an example of an HVAC assembly in accordance with one or more embodiments.

Turning to FIG. 8, FIG. 8 shows a graph representing linear behavior of three different doors in an HVAC assembly according to one or more embodiments. Specifically, FIG. 8 shows a graph (800) including a relation between a percentage of travel (i.e., the vertical axis labeled "Travel (%)") for the three different doors (i.e., the lines labeled "Cool Door %," "Hot Middle Door %," and "Hot Rear Door %") and a percentage of mixed air in resulting from the HVAC assembly (i.e., the horizontal axis labeled "Blend (%)"). In this graph, a delay is not inserted in the movement of the doors.

The percentage of travel is a percentage of open space that each of the three doors is capable of providing. As such, the percentage of travel is representative of an entirety of an open space when a door is open, which is directly related to an angle of aperture for each door. Specifically, an actuated door will rotate to open, which in turn will provide an opening proportional to the percentage of travel for each door.

The percentage of mixed air is a percentage of the air supplied by the HVAC assembly and, in this graph, corresponds to a percentage of a total air exchange as each of the doors moves from a completely open position to a completely closed position, or vice versa. Specifically, as evidenced by the leftmost data point for each door, not all the doors start from a closed position. As such, the percentage of mixed air in FIG. 8 represents a configuration of doors according to one or more embodiments described with respect to FIGS. 1-7. To this point, the percentage of mixed air transitions the air supplied from the HVAC system from full cold air to full hot air.

The three different doors may be any of the upper door, middle door, and lower door described with respect to FIGS. 1-7. As such, the three different doors may be any of the aforementioned doors when a specific door is configured for cold air flow, hot middle air flow, or hot rear air flow.

Further, in FIG. 8, as a representation of linear behavior according to one or more embodiments, the HVAC assembly is not implementing the delay in any of the three different doors. As such, the transition from full cold air flow to full hot air flow is sharp and the transition does not allow comfortable flow of mixed air.

Figure 9:
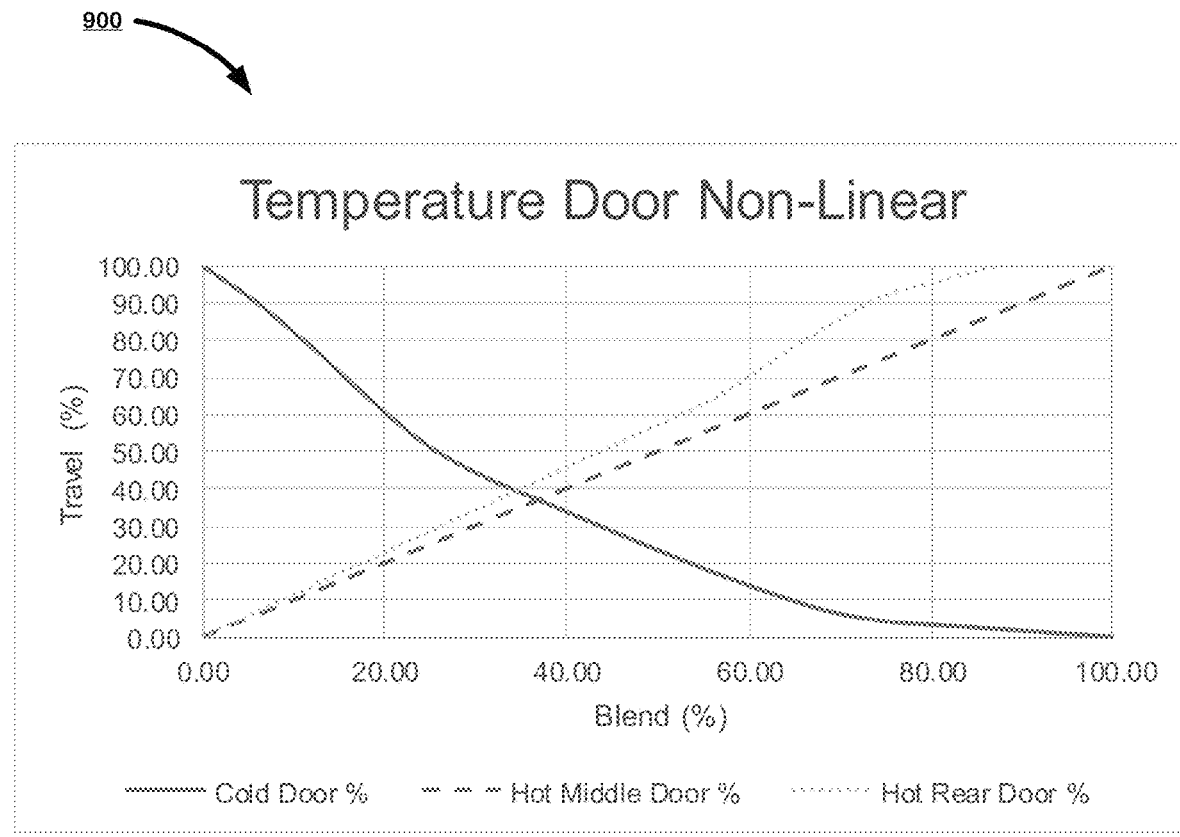
FIG. 9 shows a graph representative of an example of an HVAC assembly in accordance with one or more embodiments.

Turning to FIG. 9, FIG. 9 shows a graph representing shows a graph representing non-linear behavior of three different doors in an HVAC assembly according to one or more embodiments. Specifically, FIG. 9 shows a graph (900) including a relation between a percentage of travel (i.e., the vertical axis labeled "Travel (%)") for the three different doors (i.e., the lines labeled "Cool Door %," "Hot Middle Door %," and "Hot Rear Door %") and a percentage of mixed air in resulting from the HVAC assembly (i.e., the horizontal axis labeled "Blend (%)"). In this graph, a delay is inserted in the movement of the doors.

The percentage of travel, the percentage of mixed air, and the three different doors are the same components as those described with respect to FIG. 8.

Further, in FIG. 9, as representation of non-linear behavior according to one or more embodiments, the HVAC assembly is implementing the delay in any of the three different doors. As such, the transition from full cold air flow to full hot air flow is controlled automatically, or based on a predetermined configuration, and the transition allows comfortable flow of mixed air. Specifically, the transition between one air flow to another (i.e., full cold air flow to full hot air flow) may be implemented by automated systems in which user intervention may not be required. In one or more embodiments, a user may determine an implementation of the delay and this configuration may be saved as a model for future used. The model may be implemented in a subsequent use of the HVAC assembly with or without requiring confirmation from a user. To this point, the HVAC assembly may gradually change a percentage of mixed air according to predetermined and dynamically changing models over time.

Figure 10:
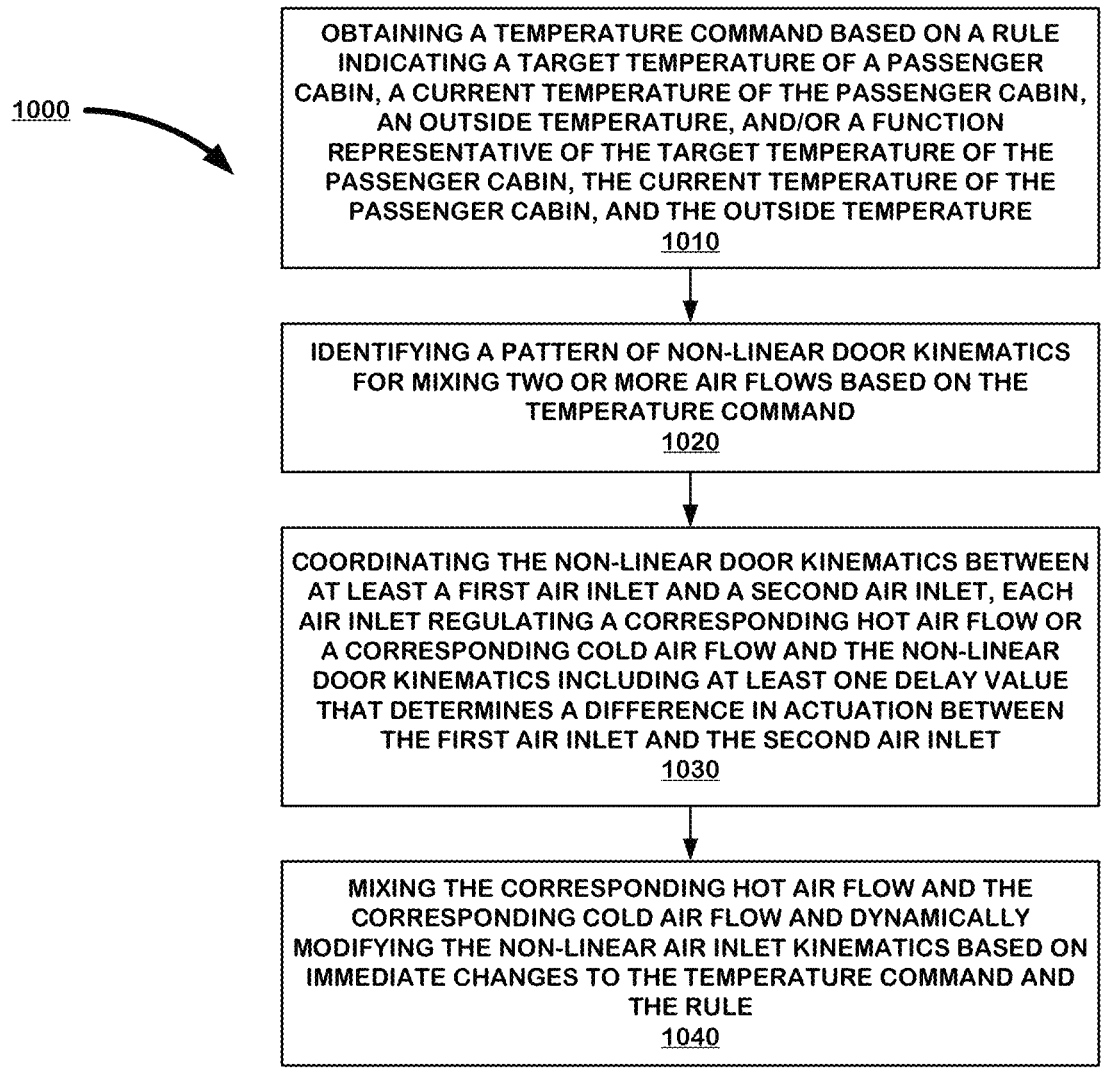
FIG. 10 shows a flowchart describing a process for managing air mixing door kinematics in an HVAC in accordance with one or more embodiments.

Turning to FIG. 10, FIG. 10 shows a flowchart in accordance with one or more embodiments. Specifically, FIG. 10 describes a method (1000) for managing air mixing door kinematics in an HVAC assembly of a motor vehicle. One or more blocks in FIG. 1 or 2 may be performed by one or more components as described above in FIGS. 3-9. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1010, a temperature command is obtained in accordance to one or more embodiments. The temperature command is based on a rule indicating a target temperature of a passenger cabin, a current temperature of the passenger cabin, an outside temperature, and/or a function representative of the target temperature of the passenger cabin, the current temperature of the passenger cabin, and the outside temperature. For example, a sensor arranged with an internal link cam collect signals associated to one or more doors allowing passage of air flows. As such, the sensor configured for obtaining one or more of the various temperature values may receive constant feedback from one or more sensors associated to the various doors.

In Block 1020, a pattern of non-linear door kinematics for mixing two or more air flows are identified in accordance to one or more embodiments. The pattern may be determined upon processing of the obtained values. For example, the values obtained in Block 1010 may be translated based upon their physical relations with velocity, volume, and temperature. As such, the pattern may be generated by calculating the opening of the various doors in delay with respect to one another as a function of time.

In Block 1030, the non-linear door kinematics may be coordinated in accordance to one or more embodiments. The non-linear door kinematics are coordinated between the various doors regulating a corresponding hot air flow or a corresponding cold air flow. To this point, the non-linear door kinematics include at least one delay value that determines a difference in actuation between the first air inlet and the second air inlet. As commands arrive to the HVAC assembly, the HVAC assembly evaluates instructions of required functions, such as supplying a specific temperature or pressure to a passenger cabin. In particular, the HVAC assembly may receive a command for attaining a required temperature. In response, the HVAC assembly may evaluate the pressure, temperature, and velocity of air flow. As such, the HVAC assembly may determine that a specific combination of mixing door kinematics following the identified pattern.

In Block 1040, the corresponding hot air flow and the corresponding cold air flow are mixed and the non-linear kinematics are dynamically modified based on immediate changes to the temperature command and the rule in accordance to one or more embodiments. The passenger cabin may be monitored to obtain several parameters associated with it. In particular, information and parameters relating to an inside temperature, pressure, or humidity level may be obtained through one or more sensing devices. For example, the sensing devices may be hardware or software configured to sample physical phenomena. This step may include, for example, automatically adapting the degree of aperture of each of the various doors to accommodate an optimum configuration for the doors to meet a user demand. Alternatively, this step may include, for example, automatically adapting the degree of aperture of each of the various doors to accommodate an optimum configuration for the doors to meet a minimum energy usage.

In one or more embodiments, "automatically" refers to dynamically adapting the openings of the doors without a user's interference in accordance to one or more embodiments. Further, in one or more embodiments, "dynamically adapting" is performed without the use of electronics and is automatically determined upon perception of mechanical flaps actively shifting degrees of apertures for each of the doors.

In one or more embodiments, the same configurations and in opposite behavior are applied to the various doors. As such, inverse configurations to those shown in FIGS. 1-10 may be configured for the HVAC assembly.

Figure 11:
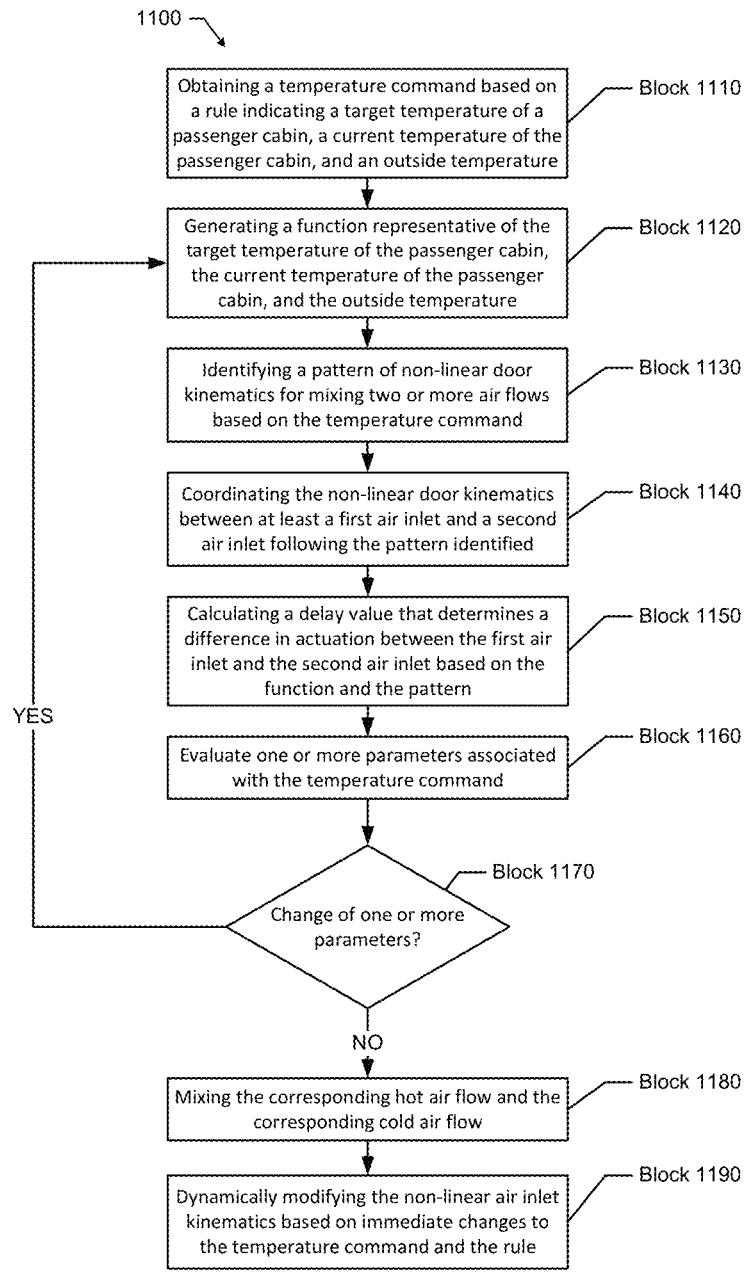
FIG. 11 shows a flowchart describing a process for managing air mixing door kinematics in an HVAC in accordance with one or more embodiments.

Turning to FIG. 11, FIG. 11 shows a flowchart in accordance with one or more embodiments. Specifically, FIG. 11 describes a method (1100) for managing air mixing door kinematics in an HVAC assembly of a motor vehicle. One or more blocks in FIG. 1 or 2 may be performed by one or more components as described above in FIGS. 3-9. While the various blocks in FIG. 11 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1110, a temperature command is obtained based on a rule indicating a target temperature of a passenger cabin, a current temperature of the passenger cabin, and an outside temperature in accordance to one or more embodiments. For example, the various obtaining means discussed in reference to FIGS. 1-9 may be arranged to obtain one or more temperature values. As described above, by definition, temperature samples associated to air flow may provide volume and pressure information.

In Block 1120, a function is generated representative of the target temperature of the passenger cabin, the current temperature of the passenger cabin, and the outside temperature in accordance to one or more embodiments. For example, a target temperature may be requested or selected in a passenger cabin. In one or more embodiments, this required temperature or pressure may be treated as the target temperature to be achieved over a period of time.

In Block 1130, a pattern of non-linear door kinematics is identified for mixing two or more air flows based on the temperature command in accordance to one or more embodiments. For example, the pattern may include coordinated aperture values for each of the various doors. In particular, the doors may be implemented at different degrees of aperture for performing adaptive behavior automatically in response to changes inside the passenger cabin.

In Block 1140, the non-linear door kinematics are coordinated between at least a first air inlet and a second air inlet following the pattern identified in accordance to one or more embodiments. In particular, the various doors are actuated at a same or different times and the various doors rotate consistent with the pattern.

In Block 1150, a delay value is calculated in accordance to one or more embodiments. The delay determines a difference in actuation between the first air inlet and the second air inlet based on the function and the pattern. In such event, the delay may be determined or a predetermined delay may be used if the function has a corresponding profile previously calculated in the HVAC assembly. As such, the delay is implemented simultaneously and upon calculation. If a delay cannot be calculated, a predetermined delay may be implemented.

In Block 1160, one or more parameters associated with an inside of a passenger cabin of the motor vehicle are evaluated in accordance with one or more embodiments. For example, the inside of the passenger cabin is sampled for one or more parameters and these parameters are evaluated to determine triggers for changing a required mixed air pressure.

In one or more embodiments, the one or more parameters are selected from a group consisting of: a humidity level, a difference in temperature with an outside of the passenger cabin, a pressure on an air intake door, and a primary door. As such, by modifying the temperature in the manner discussed above, for example, the humidity level may be controlled for preventing fogginess of the vehicle windows.

In Block 1170, a determination is made as to whether a change of one or more of the parameters has occurred in accordance to one or more embodiments. Specifically, a decision is made to determine whether one or more parameters have been modified. If it is determined that the one or more parameters were not changed, the method proceeds to Block 1180 to determine a compensation air pressure associated with the required mixed air pressure. For example, a level of humidity may remain the same inside the passenger cabin and the required mixed air pressure stays the same allowing further actuation in the HVAC assembly. In particular, the HVAC assembly may proceed to reach the previously identified required mixed air pressure. Alternatively, if one or more parameters are determined to have changed, the method moves to Block 1120 to identify a new required mixed air pressure. For example, if the humidity in the passenger cabin where to change, a new mixed air pressure may be required in the HVAC assembly to reach a required temperature value.

In Block 1180, the corresponding hot air flow and the corresponding cold air flow are mixed in accordance to one or more embodiments. In such event, a difference between a current temperature and the target temperature is determined. As such, a decision is made to reach the target temperature by any of the modes discussed above.

In Block 1190, the non-linear air inlet kinematics are dynamically modified based on immediate changes to the temperature command and the rule in accordance to one or more embodiments. The target air temperature is maintained irrespective of changes in the one or more parameters. Similarly, the HVAC assembly may be configured to determine new compensation pressure values to maintain a constant temperature inside the passenger cabin.

In one or more embodiments, the same configurations and in opposite behavior are applied to the various doors. As such, inverse configurations to those shown in FIGS. 1-11 may be configured for the HVAC assembly.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A heating, ventilation, and air-conditioning (HVAC) assembly for managing air mixing door kinematics of a motor vehicle, the assembly comprising:
    a first door configured for allowing passage of a first air flow;
    a second door configured for allowing passage of a second air flow;
    obtaining means configured to obtain a temperature command indicating a target temperature for a passenger cabin;
    identifying means configured to identify a pattern of non-linear door kinematics between the first door and the second door for mixing the first air flow and the second air flow based on the temperature command;
    coordinating means configured to coordinate the non-linear door kinematics between the first door and the second door,
        wherein the non-linear door kinematics comprise at least one delay value that determines a difference in actuation between the first door and the second door; and
    mixing means configured to mix the first air flow and the second air flow,
    wherein the identifying means and the coordinating means dynamically modify the non-linear door kinematics based on immediate changes to the temperature command, and wherein the identifying means are connected to both the obtaining means and the coordinating means.

2. The assembly of claim 1,
wherein the obtaining means and the identifying means evaluate one or more parameters associated with the temperature command, and
wherein the obtaining means obtain at least one result from the evaluated one or more parameters.

3. The assembly of claim 2,
wherein the obtaining means and the identifying means determine the immediate changes to the temperature command and a rule based on the at least one result, and
wherein the obtaining means and the identifying means update the non-linear door kinematics based on the immediate changes to the temperature command and the rule.

4. The assembly of claim 1, the assembly further comprising:
a third door configured for allowing passage of a third air flow,
wherein the coordinating means coordinate non-linear door kinematics of the third door respective to the non-linear door kinematics between the first door and the second door.

5. The assembly of claim 4, wherein the first door, the second door, and the third door are each configured to dynamically move from a respective closed position to a respective open position.

6. The assembly of claim 5, wherein the first door and the second door are moved by different actuators that implement the at least one delay value with respect to one another.

7. The assembly of claim 6, wherein the second door and the third door are moved by a same actuator that implements the at least one delay value with respect to the first door using a plurality of links and levers.

8. The assembly of claim 5, wherein the first door and the second door are moved by a same actuator that implements the at least one delay value with respect to one another using a plurality of links and levers.

9. The assembly of claim 4,
wherein the obtaining means comprise an Engine Control Unit (ECU) of the motor vehicle coupled to an internal link cam,
wherein the identifying means comprise a processor coupled to the internal link cam,
wherein the coordinating means comprise a plurality of links and levers interconnected with the first door, the second door, and the third door, and
wherein the mixing means comprise a first engagement pocket and a second engagement pocket arranged cooperatively with respect to the coordinating means, the first door, the second door, and the third door.

10. A method for managing air mixing door kinematics in a heating, ventilation, and air-conditioning (HVAC) assembly for a motor vehicle, the method comprising:
obtaining, via obtaining means, a temperature command indicating a target temperature for a passenger cabin;
identifying, via identifying means, a pattern of non-linear door kinematics between a first door and a second door for mixing two or more air flows based on the temperature command;
coordinating, via coordinating means, the non-linear door kinematics between the first door and the second door, each door regulating a corresponding air flow,
wherein the non-linear door kinematics comprise at least one delay value that determines a difference in actuation between the first door and the second door;
mixing the corresponding air flow of the first door with the corresponding air flow of the second door; and
dynamically modifying the non-linear door kinematics based on immediate changes to the temperature command, and
wherein the identifying means are directly connected to both the obtaining means and the coordinating means.

11. The method of claim 10, the method further comprising:
evaluating one or more parameters associated with the temperature command; and
obtaining at least one result from the evaluating.

12. The method of claim 11, the method further comprising:
determining the immediate changes to the temperature command based on the at least one result; and
updating the non-linear door kinematics based on the immediate changes to the temperature command.

13. The method of claim 10, the method further comprising:
coordinating non-linear door kinematics of a third door respective to the non-linear door kinematics between the first door and the second door, the third door regulating a cold air flow,
wherein the at least one delay value determines differences in actuation between the first door, the second door, and the third door.

14. The method of claim 13, wherein the first door, the second door, and the third door are each configured to dynamically move from a respective closed position to a respective open position.

15. The method of claim 13, wherein the at least one delay value is calculated using information gathered by an internal link cam coupled to the second door or the third door.

16. The method of claim 15, wherein the first door and the second door are moved by different actuators that implement the at least one delay value with respect to one another.

17. The method of claim 16, wherein the second door and the third door are moved by a same actuator that implements the at least one delay value with respect to the first door using a plurality of links and levers.

18. The method of claim 17,
wherein the first door and the second door are moved by a same actuator that implements the at least one delay value with respect to one another using a plurality of links and levers.

19. A heating, ventilation, and air-conditioning (HVAC) assembly for managing air mixing door kinematics of a motor vehicle, the assembly comprising:
a first door configured for allowing passage of a first air flow;
a second door configured for allowing passage of a second air flow;
a third door configured for allowing passage of a third air flow;
obtaining means configured to obtain a temperature command representative of a target temperature for a passenger cabin;
identifying means configured to identify a pattern of non-linear door kinematics between the first door, the second door, and the third door for mixing two or more of the first air flow, the second air flow, and the third air flow based on the temperature command;
coordinating means configured to coordinate the non-linear door kinematics between the first door, the second door, and the third door, wherein the non-linear door kinematics comprise at least one delay value that determines differences in actuation between the first door, the second door, and the third door; and mixing means configured to mix the first air flow, the second air flow, and the third air flow, wherein the identifying means and the coordinating means dynamically modify the non-linear door kinematics based on immediate changes to the temperature command, and wherein the identifying means are connected to both the obtaining means and the coordinating means.

20. The assembly of claim 19, wherein the obtaining means and the identifying means evaluate one or more parameters associated with the temperature command, and wherein the obtaining means obtain at least one result from the evaluated one or more parameters.

\* \* \* \* \*